United States Patent [19]
Audoux et al.

[11] Patent Number: 4,871,499
[45] Date of Patent: Oct. 3, 1989

[54] METHOD OF MOLDING A FLEXIBLE TUBE OF LOW THERMAL LONGITUDINAL COEFFICIENT OF EXPANSION

[75] Inventors: Christian Audoux; Edouard Rivas; Georges Rossignol, all of Montereau, France

[73] Assignees: Societe Industrielle de Liaisons Electriques; Societe Anonyme de Telecommunications, Paris, France

[21] Appl. No.: 93,673

[22] Filed: Sep. 8, 1987

[30] Foreign Application Priority Data

Sep. 8, 1986 [FR] France ................................ 86 12575

[51] Int. Cl.$^4$ ............................................ B29C 47/06
[52] U.S. Cl. .................................. 264/173; 264/209.5; 264/235.6
[58] Field of Search ...................... 264/1.5, 173, 209.5, 264/514, 515, 150, 235.6, 342 R

[56] References Cited

U.S. PATENT DOCUMENTS

| | | | |
|---|---|---|---|
| 2,922,194 | 1/1960 | Lampard et al. | 264/209.5 |
| 3,553,303 | 1/1971 | Zarainik | 264/150 |
| 4,499,041 | 2/1985 | Hohn et al. | 264/173 |
| 4,735,538 | 4/1988 | Reed et al. | 264/150 |

*Primary Examiner*—James Lowe
*Attorney, Agent, or Firm*—Sughrue, Mion, Zinn, Macpeak & Seas

[57] ABSTRACT

A tube for protecting and guiding an optical fiber is constituted by two tubes which are co-extruded and then stretched. The inner tube thus acquires a reduced coefficient of linear expansion, which is closer to that of glass. The outer tube protects the inner tube from fibrils appearing on its surface.

9 Claims, 1 Drawing Sheet

METHOD OF MOLDING A FLEXIBLE TUBE OF LOW THERMAL LONGITUDINAL COEFFICIENT OF EXPANSION

FIELD OF THE INVENTION

The present invention relates to a tube for detecting and guiding optical fiber which is constituted by two tubes which are co-extruded and then stretched. The inner tube thus acquires a reduced coefficient of linear expansion, which is closer to that of glass. The outer tube protects the inner tube from fibrils appearing on its surface.

BACKGROUND OF THE INVENTION

In optical fiber telecommunications, flexible tubes are often used for identifying, protecting, and guiding fibers over portions of their paths where they are not integrated in a cable.

For example, mention may be made of the connections between grooved-core cables and connection systems in splice boxes a in distribution boxes, outputs of emitters and receivers, etc.

In general, each end of the flexible tube is connected either to the end of a cable or else to a support integrated with a component.

In the particular case of the splaying-out device (DE) of French patent application No. 82/7483, the flexible tubes are fixed to a head for extracting the fibers from the grooved cores; the head is itself fixed to the core and the other ends of the tubes are fixed to a connection box.

The flexible tubes are generally made of extruded thermoplastic materials having a linear expansion coefficient $\alpha L$ lying in the range 500 to $1,500 \times 10^{-7} K^{-1}$ (per degree), which is to be compared with the equivalent coefficient of glass which is about 5 to $10 \times 10^{-7} K^{-1}$. Differential expansion therefore arises which may apply mechanical stresses to the fibers and to the connections.

In normal applications, the flexible tubes are disposed in coils so as to store reserve lengths of fibers. Since the inside diameter of the tubes is not less than two to three times the outside diameter of the fibers, there is theoretically enough free space to take up the differential expansion, provided, that is, that the fiber can slide freely along the tube, and provided it is suitably positioned on assembly.

Where these conditions cannot be satisfied, or where temperature differences are too great, mechanical stresses (bending, traction) are applied to the fiber and to the connections, with the following consequences:
reversible or irreversible signal attenuation; and
danger of fiber breakage, in the long term.

It is known that a stretching treatment at a temperature less than the melting or softening temperature of thermoplastic materials may give rise to a high degree of anisotropy in their physical properties, and in particular in their expansion coefficients. By this means, it is possible to obtain flexible tubes having a longitudinal linear expansion coefficient $\alpha L$ which is considerably less than that of the initial material.

By way of example, for a flexible tube made of polypropylene, it is possible to obtain values of $\alpha L$ which are less than $100 \times 10^{-7} K^{-1}$.

However, it has been observed that when a polypropylene tube is subjected to stretching treatment suitable for obtaining an acceptable coefficient of linear expansion (e.g. less than $400 \times 10^{-7} K^{-1}$), it becomes highly sensitive to the apperance of surface fibrils. Such fibrils are formed on the surface of the tube, in particular when it is rubbed. They constitute a considerable impediment in the operations of manufacturing the tubes or the splaying-out devices, and also to the use thereof.

The aim of the present invention is to provide a flexible tube of thermoplastic material having a mean linear expansion coefficient which is less than $300 \times 10^{-7} K^{-1}$ in the temperature range $-30°$ C. to $+60°$ C., and which does not give rise to the formation of surface fibrils during the operations of manufacture and assembly.

It has been observed that there is a critical stretching ratio rc which gives rise to the appearance of fibrils: this critical stretching ratio varies as a function of the nature of the material, and for a given polymer material it varies as a function of its molecular weight.

SUMMARY OF THE INVENTION

It is thus possible to obtain low $\alpha L$ flexible tubes without fibrils by combining two layers in a single tube:
a base material Mb which, after stretching to a ratio $Si/Sf = r$, has a considerably reduced coefficient of expansion;
a coating material Mc which, after being stretched to the same ratio r, has physical characteristics which are little changed, and an in particular has no tendency to form fibrils;
said two materials adhering well to each other.
Such tubes are manufactured by the following steps:
a. a two-layer tubular preform is extruded, preferably with both layers being co-extruded in a single pass;
b. the preform is stretched to ratio r at a temperature less than the melting temperature of the base material Mb; and
c. thermal stabilization treatment at a temperature which is at least 10° C. greater than the maximum in-use temperature.

DETAILED DESCRIPTION OF THE INVENTION

The two materials may have the same melting point. In which case, the coating material must have properties that are little modified by stretching. The melting temperatures could be different. In a particularly advantageous implementation of the invention, the melting temperature of the coating material is less than the stretching temperature. The coating material is thus in the liquid state during stretching, and as a result the stretching operation has no effect on its properties after cooling.

In order to avoid the appearance of fibrils, the thickness of the base layer represents at least 80% of the total thickness and the thickness e of the coating material Mc on the finished tube should be greater than 2 microns, preferably greater than 5 microns.

Also, Mc must not be too thick relative to the total thickness of the tube so that its influence on $\alpha L$ remains negligible: $e_{Mc}/e_{total} < 0.2$ and preferably $< 0.1$.

In order to obtain good adherence between the layers, Mb and Mc are preferably of similar chemical natures, for example they may be polyolefins.

For example:

Mb=high molecular weight polypropylene for which the critical stretching ratio rc=5.5;

Mc=high density polyethylene for which rc>10.

With these two materials, a two-layer tubular preform is extruded having an inside diameter of 1.3 mm and an outside diameter of 2.6 mm, with the outer layer (Mc) having a thickness of 0.03 mm.

This preform is then reheated to a temperature lying in the range 120° C. to 160° C. and is stretched to a ratio r=6.5.

The resulting tube is then stabilized by heat treatment for 12 hours at 90° C.

This tube has a mean $\alpha L < 200 \times 10^{-7} K^{-1}$ between $-30°$ C. and $+50°$ C. Fibrils are not formed by rubbing.

The materials Mb and Mc may be of the same chemical nature, for example polypropylene having significantly different molecular weights:

Mb may be a polypropylene having a meltingindex measured at 190° C. under a load of 5 kg, $MI_{190,5}=1$; and Mc is a polypropylene with $MI_{190,5}=8$.

The results obtained with this pair of materials are similar to those obtained with the pair polypropylene/polyethylene.

Flexible tubes are often used for identifying fibers, and tubes may be distinguished by using different colors. For example, the tubes within a single splaying-out device may be identified by a color code. In the context of the present invention, such identification may be performed by including coloring materials in the bulk of the outer coating material (Mc).

One particular application of tubes in the present invention lies in making splaying-out devices in accordance with French patent application No. 82/7483.

EXAMPLE

Figure 1:
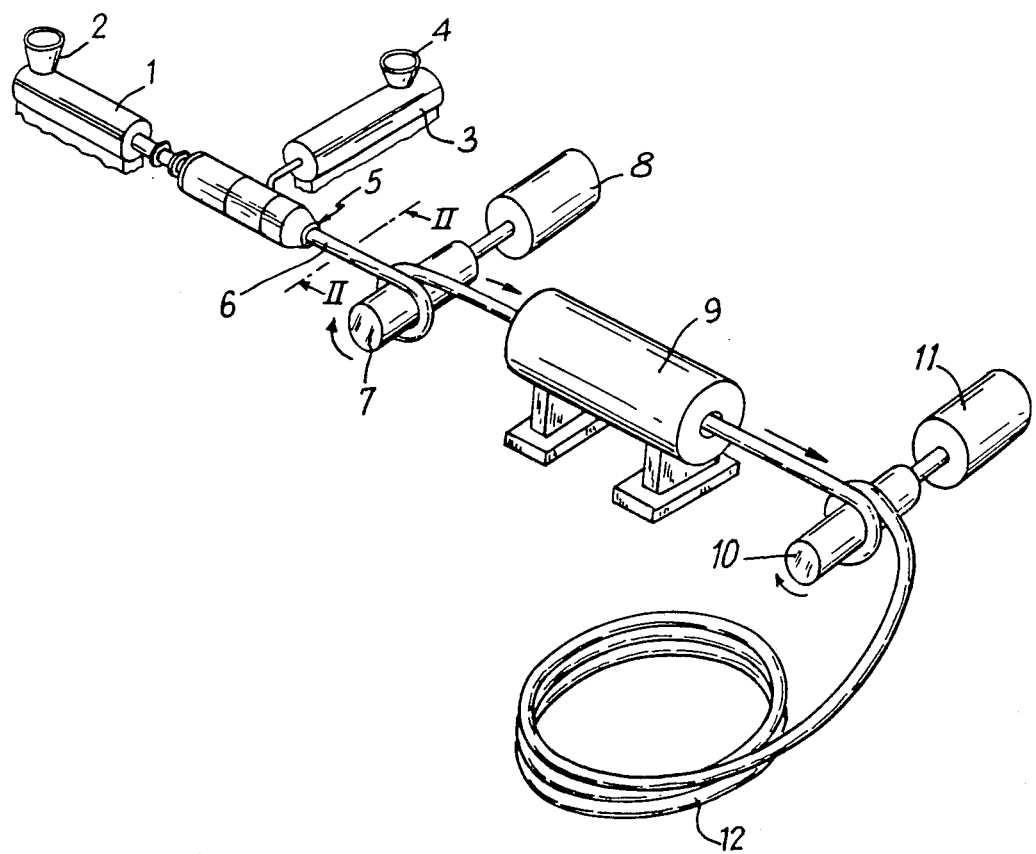
FIG. 1 is a schematic perspective view illustrating the the main steps of the method of the present invention.

In the method of the present invention, a device for carrying such out is, for example, a conventional co-extruding device as shown in FIG. 1. This device includes a first extruder 1 having a resin supply means 2 fed with a polymer material, for example, a polypropylene, a second extruder 3 having a resin supply means 4 fed with a polymer material, for example, a polyethylene, wherein both extruders are connected to a die apparatus 5 within which the material coming from extruder 1 is formed according to a tubular base layer Mb and the material coming from extruder 3 is formed according to a tubular coating layer Mc having a thickness much smaller than the thickness of the base layer.

The flexible tube 6 which comes out from the dye appartus 5 is wound on a first stretching roller 7 driven by a first driving means 8. Downstream the first stretching roller 7, the flexible tube 6 is passed through a heating means 9 in which it is heated at a temperature below the melting temperature of the base layer. Downstream heating means 9, the flexible tube 6 is wound again according to on a second stretching roller 10 driven by a driving means 11 at a speed much higher than the first stretching roller 7. The flexible tube 6 is thus longitudinally stretched in the heating means a ratio which corresponds to the ratio between the rotation speeds of the first and second stretching roller.

Downstream of the stretching roller 10, the stretched flexible tube is formed according to coil 12. Once a predetermined length of flexible tube is thus coiled, the flexible tube 6 is cut and the coil is placed in a heating means (not shown) in which it is heat treated t a temperature which is at least 10° C. greater than the maximum in use temperature.

The flexible tube 6 coming out from the die apparatus 5 may also be coiled and transferred to a separate stretching station. This is carried out in particular, when the rate of production of the co-extruding device is higher than the rate of the stretching station.

Figure 2:
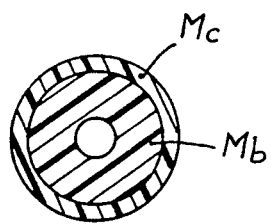
FIG. 2 is an enlarged cross-section of the preform of the present invention taken along line II—II of FIG. 1.

FIG. 2 shows a cross-section of the preform obtained using the process of the present invention.

We claim:

1. A method of manufacturing a flexible tube having a low thermal longitudinal coefficient of expansion comprising the steps of:

(a) preparing a two layer tubular preform by extrusion having a base layer (Mb) made of a polymer having a higher thermal coefficient of expansion in a longiditunal direction of said preform, and a coating layer (Mc) having a thickness which is such that the influence of said coating layer on said thermal coefficient of expansion is negligible;

(b) heating said preform at a stretching temperature which is lower than the melting temperature of the polymer of said base layer and simultaneously longitudinally stretching said preform to a ratio such that the thermal coefficient of said base layer is considerably reduced after stretching and no fibril is formed in said coating layer; and (c) submitting said stretched preform to a stabilization heat treatment at a temperature which is at least 10° C. greater than the maximum in use temperature.

2. The method according to claim 1, wherein the stretching temperature is greater than the melting temperature of the material coating layer.

3. The method according to claim 1, wherein said tubular preform is obtained by co-extruding said base layer and said coating layer.

4. The method according to claim 1, wherein said base layer has a thickness representing at least 80% of a total thickness of said base layer and coating layer.

5. The method according to claim 1, wherein said base layer and said coating layer are made of polyolefins.

6. The method according to claim 5, wherein said base layer and said coating layer are made of polypropylene and wherein the polypropylene of said coating layer has a molecular weight which is substantially less than the polypropylene of said base layer.

7. The method according to claim 5, wherein said base layer is made of polypropylene and said coating layer is made of polyethylene.

8. The method according to claim 5, wherein the thickness of the coating layer is greater than $2\mu$.

9. The method according to claim 8, wherein the thickness of the coating layer is greater than $5\mu$.

* * * * *